United States Patent
Hung

[11] Patent Number: 5,844,323
[45] Date of Patent: Dec. 1, 1998

[54] ROTATABLE WHEEL FOR DEVELOPING FLUID KINETIC ENERGY BY ACCEPTING ACTION FORCES FROM MULTIPLE DIRECTIONS

[76] Inventor: Ming-Tung Hung, 2F-1, No. 83, I Li St., Taipei, Taiwan

[21] Appl. No.: 695,890

[22] Filed: Aug. 12, 1996

[51] Int. Cl.[6] .............................. F03B 13/00; H02P 9/04
[52] U.S. Cl. .............................. 290/54; 290/42; 290/43; 290/44; 290/53; 290/55; 416/17; 416/108; 416/111
[58] Field of Search ................... 290/42, 43, 44, 290/53, 54, 55; 416/17, 108, 111

[56] References Cited

U.S. PATENT DOCUMENTS

| | | | |
|---|---|---|---|
| 3,743,848 | 7/1973 | Srickland | 290/55 |
| 4,095,422 | 6/1978 | Kurakake | 60/398 |
| 4,286,922 | 9/1981 | Lew | 416/71 |
| 4,346,305 | 8/1982 | White | 290/55 |
| 4,380,417 | 4/1983 | Fork | 416/108 |
| 4,383,801 | 5/1983 | Pryor | 416/17 |
| 4,441,858 | 4/1984 | Lew | 416/17 |
| 4,673,822 | 6/1987 | Kikuchi | 290/44 |
| 5,324,164 | 6/1994 | Doering et al. | 415/150 |
| 5,333,996 | 8/1994 | Bergstein | 416/197 A |
| 5,336,933 | 8/1994 | Ernster | 290/55 |
| 5,425,619 | 6/1995 | Aylor | 416/42 |
| 5,463,257 | 10/1995 | Yea | 290/55 |
| 5,616,963 | 4/1997 | Kikuchi | 290/55 |

Primary Examiner—Steven L. Stephan
Assistant Examiner—Elvin G. Enad
Attorney, Agent, or Firm—Pro-Techtor International Services

[57] ABSTRACT

In the rotatable wheel having several radiate skeletons, some auxiliary axles are mounted on each radiate skeleton and provided at the lateral of a limb of the radiate skeleton to the direction opposite to that of external forces; a movable blade or a force accepting assembly accompanied with two movable blades is connected to an auxiliary axle, they contact one extension portion of radiate skeleton when subjected to a force to be folded inwardly and contact another extension portion when subjected to a force to be folded outwardly; the pushing forces from all directions, except that the force exerted on the movable blades is applied along the auxiliary axle, can be turned into forces to drive the rotating axle, this can be used to develope wind power, kinetic energy of liquid flow such as tide, or rapid water flow etc.

11 Claims, 14 Drawing Sheets

ROTATABLE WHEEL FOR DEVELOPING FLUID KINETIC ENERGY BY ACCEPTING ACTION FORCES FROM MULTIPLE DIRECTIONS

BACKGROUND OF THE INVENTION

1. Field of the Invention

The present invention relates to a rotatable wheel for developing fluid kinetic energy by accepting action forces from multiple directions, and especially to one comprising several set of radiate skeletons each having a plurality of movable blades and rotatable in a direction opposite to the direction of the action forces. The action forces can be turned into action forces to drive a rotating axle, thus they can be used to develop kinetic energy from wind, tide and water flow etc. in a safer and easier way without pollution but with lower cost, the present invention can be widely used and can be everlasting for use, this can solve a lot of problems in power supply.

2. Description of the Prior Art

A conventional rotatable wheel used for developing fluid kinetic energy such as a windmill takes advantage of wind power or blowing force of wind only in a single direction, i.e., wind power in the other directions can not be used for developing fluid kinetic energy, this is uneconomic. The present invention provides a rotatable wheel for developing fluid kinetic energy by accepting action forces from multiple directions, that is to say, the present invention can take advantage of wind power or water flow power, or power of tide etc. to develop fluid kinetic energy by accepting action forces from multiple directions.

SUMMARY OF THE INVENTION

The present invention provides a rotatable wheel including a plurality of movable blades mounted by a plurality of auxiliary axles provided on the rotatable wheel, the rotatable wheel is comprised of two to four set of radiate skeletons each having one or more limbs with their inner ends pivotably mounted on a rotating axle, the auxiliary axles each is parallelly provided at the lateral of a limb to the direction opposite to that of external action forces. The blades can be contacted with and push some extension portions extending from the radiate skeletons and closer to/away from the rotating axle when the blade is subjected to a force to be folded inwardly/outwardly of the rotatable wheel, thereby activates the rotatable wheel.

The present invention will be apparent in its practical structure, characteristics and functions after reading the detailed description of the preferred embodiments thereof in reference to the accompanying drawings.

DETAILED DESCRIPTION OF THE PREFERRED EMBODIMENT

Figure 1:
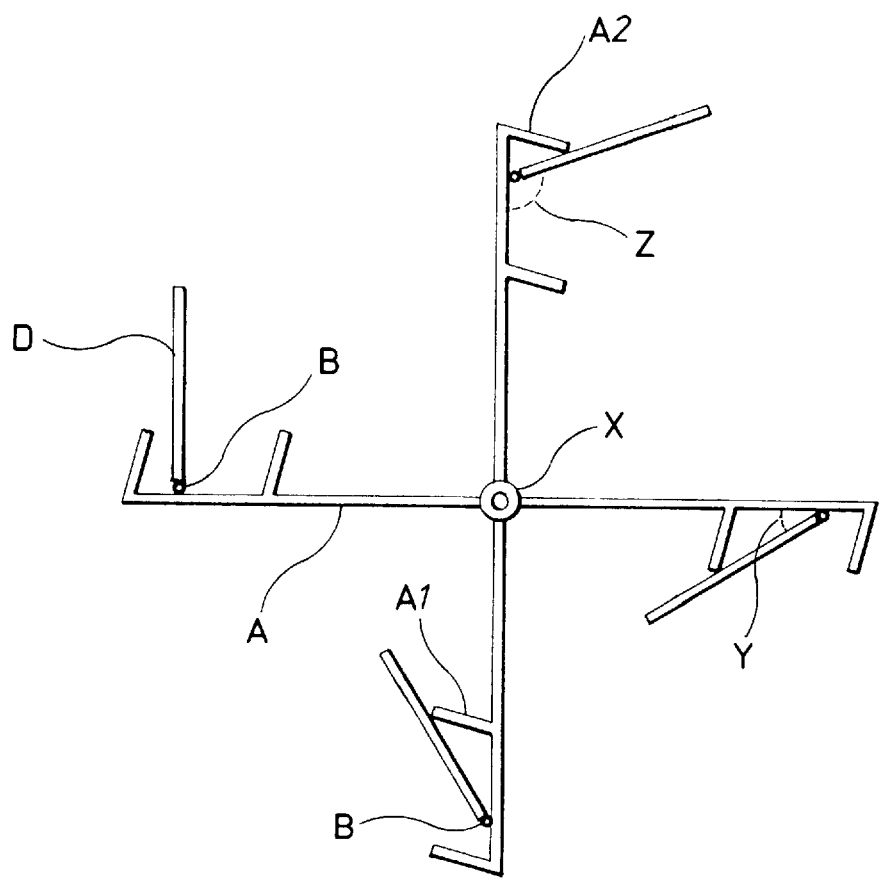
FIG. 1 and 2 are horizontal sectional views of an embodiment of the rotatable wheel of the present invention showing that each radiate skeleton has a plurality of movable blades and is rotatable in a direction opposite to the direction of action forces.
Figure 2:
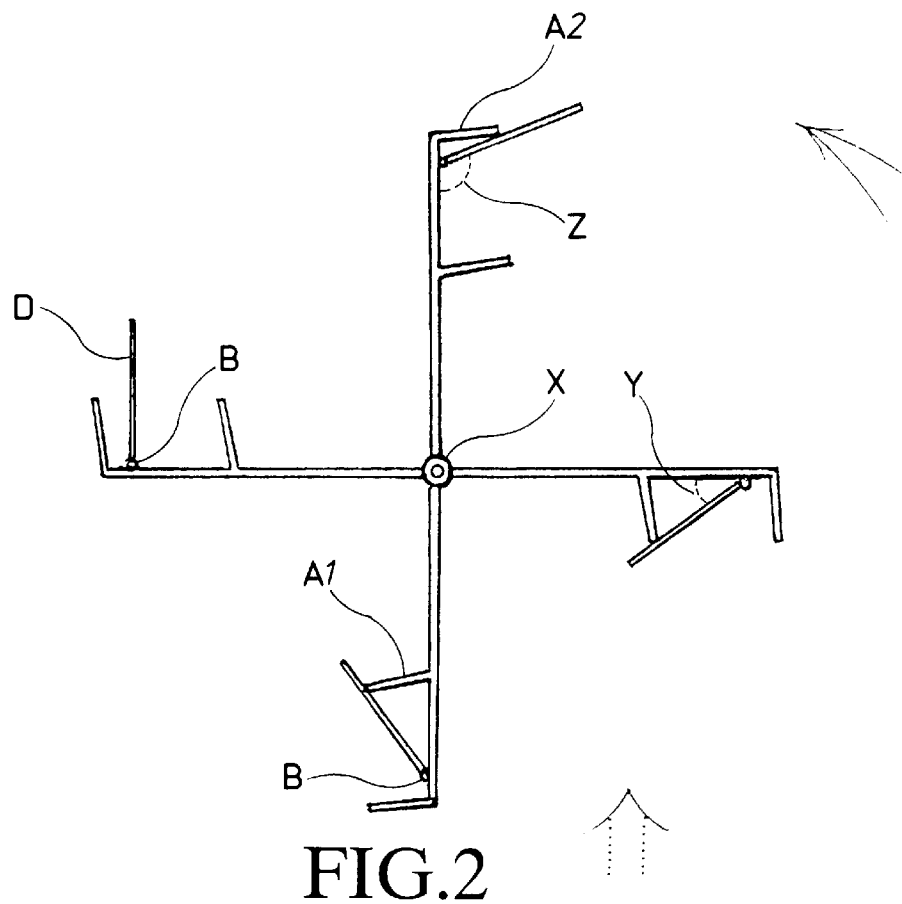
Figure 3:
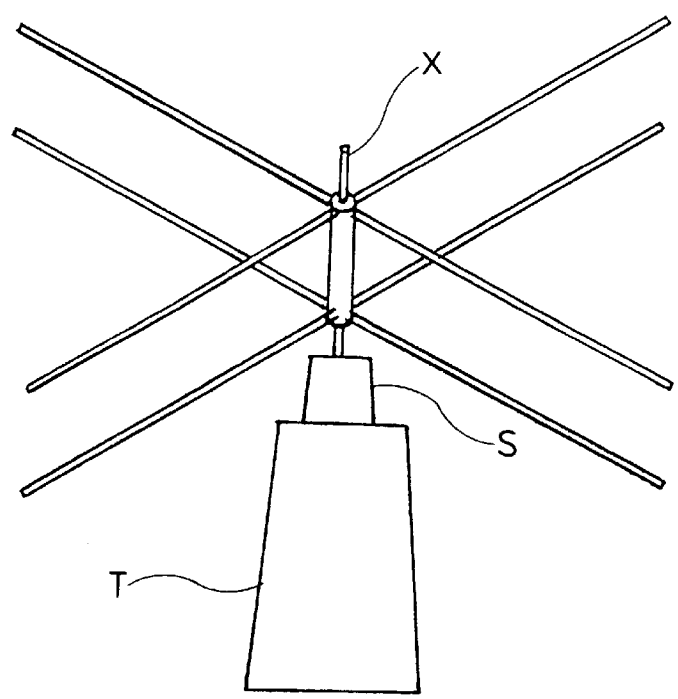
FIG. 3 to 5 are views showing several embodiments of the present invention, in each embodiment, a plurality of radiate skeletons are assembled with a rotating axle, a mechanism case, a base etc.
Figure 4:
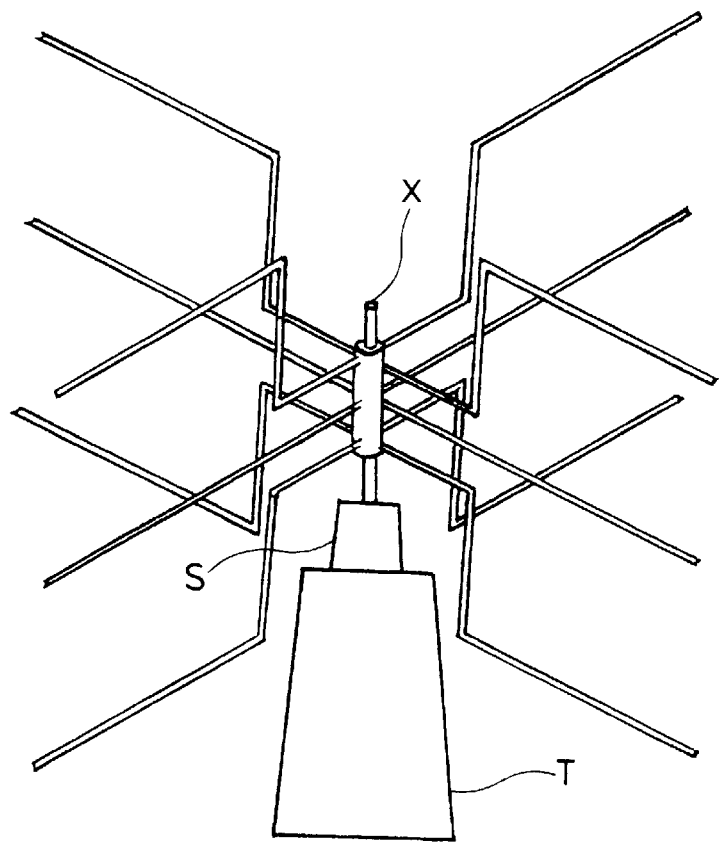
Figure 5:
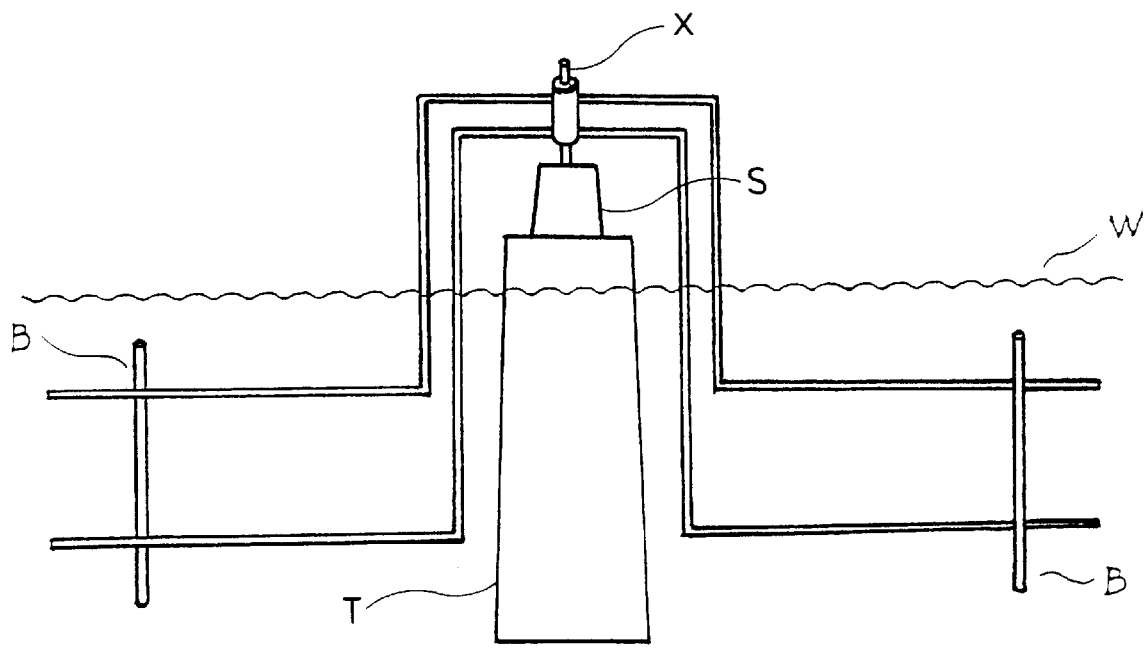
Figure 6:
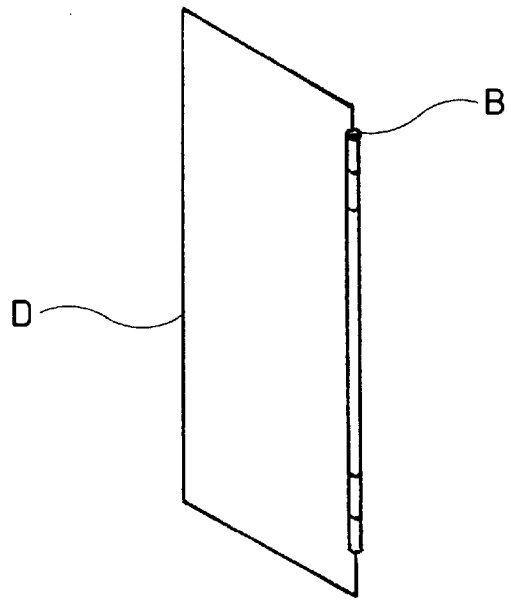
FIG. 6 is a schematic view showing a blade connecting to an auxiliary axle.
Figure 7:
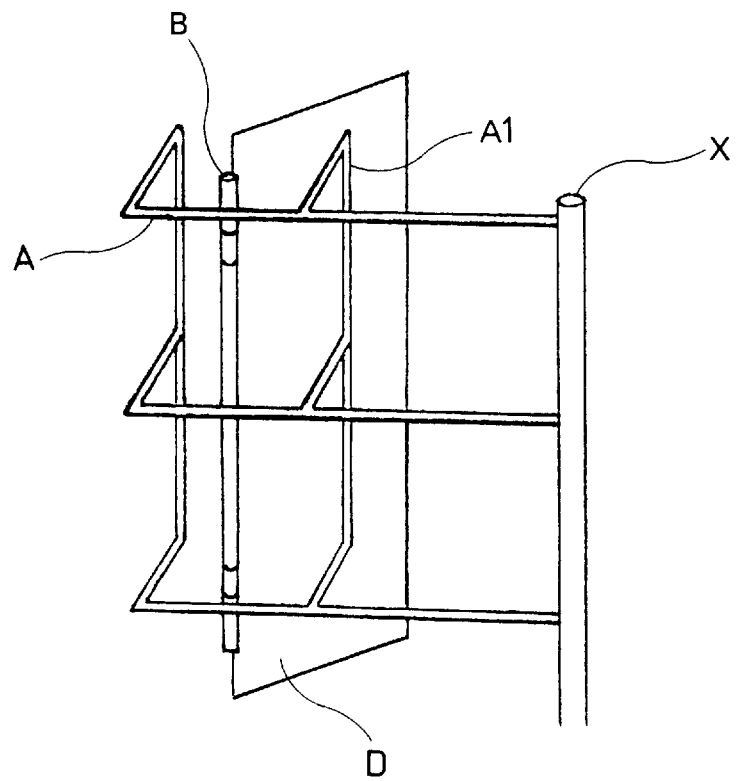
FIG. 7 is a diagramatic drawing showing a blade contacting with the extension portions from a plurality of radiate skeletons and closer to the rotating axle when the blade is subjected to a force to be folded inwardly.
Figure 8:
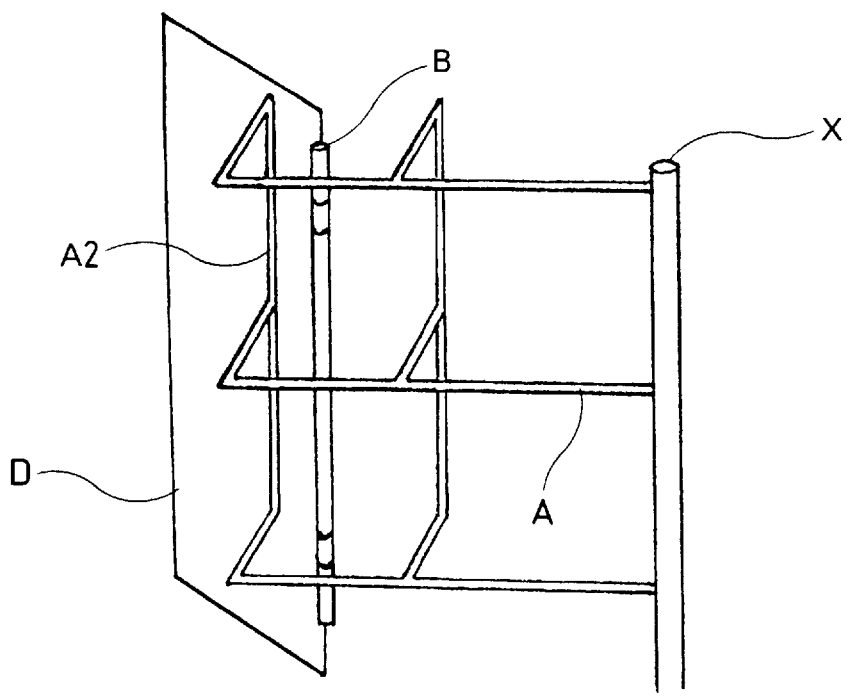
FIG. 8 is a diagramatic drawing showing the blade contacting with the other extension portions extending from the radiate skeletons and away from the rotating axle when the blade is subjected to a force to be folded outwardly.

As shown in the drawings:

1. The present invention provides a rotatable wheel including a plurality of movable blades mounted by a plurality of auxiliary axles provided on the rotatable wheel the rotatable wheel is comprised of:

a) two to four set of radiate skeletons A each having one or more limbs with their inner ends pivotably mounted on a rotating axle X, when the rotating axle X being erected vertically, taking a bird's eye view, each set of radiate skeleton A being orthogonal to the rotating axle X (as shown in FIG. 1 to 5), in FIG. 1 and 2 which are horizontal sectional views of an embodiment of the rotatable wheel of the present invention, shown therein being the rotating axle X, the radiate skeletons A; while in FIG. 3 to 5 showing several embodiments of the present invention, shown therein being the a base T, a mechanism case S for receiving a gear shifting apparatus and a generator, the rotating axle X, a plurality of dash lines each representing a set of radiate skeleton which can be made in folded shape when is required, and a water level W;

b) a strip like auxiliary axle B being mounted on each of the radiate skeletons A provided at the lateral of a limb thereof to the direction opposite to that of external action forces, the auxiliary axle B being parallel to the rotating axle X, a thin and straight movable blade D (as shown in FIG. 1, 2 and 6) being provided and connected to each auxiliary axle B;

c) an extension portion A1 and an extension portion A2 of radiate skeleton being provided on the two sides of each auxiliary axle B, the extension portions A1, A2 being on the same lateral of the limb, the movable blade D being able to contact the extension portion A1 when being subjected to a force to be folded inwardly, when viewing from above, the narrow angle Y between the movable blade D and its corresponding radiate skeleton A being about 30 to 60 degrees; the movable blade D being able to contact the extension portion A2 when being subjected to a force to be folded outwardly, and when viewing from above, the wide angle Z between the movable blade D and the radiate skeleton A being about 110 to 130 degrees (referring to FIG. 1, 2 and 7, 8); the movable blade D providing force to operate the rotating axle X, except in the direction to which the action force exerted on the movable blade D is applied along the auxiliary axle B (in this case, there will be no pushing force on nor resisting force from the movable blade D), no matter it contacting with and pressing the extension portions A1, A2 extending from the radiate skeletons A and closer to or away from the rotating axle X when it being subjected to the action force to be folded inwardly or outwardly of the rotatable wheel (as shown in FIG. 1 and 2, the arrows with double dash lines representing the source of action force, while the arrows with a single dash line representing the direction of pushing force exerted to the rotatable wheel and produced by the movable blade D when it is subjected to the action force), it being able to activate the rotatable wheel.

Figure 9:
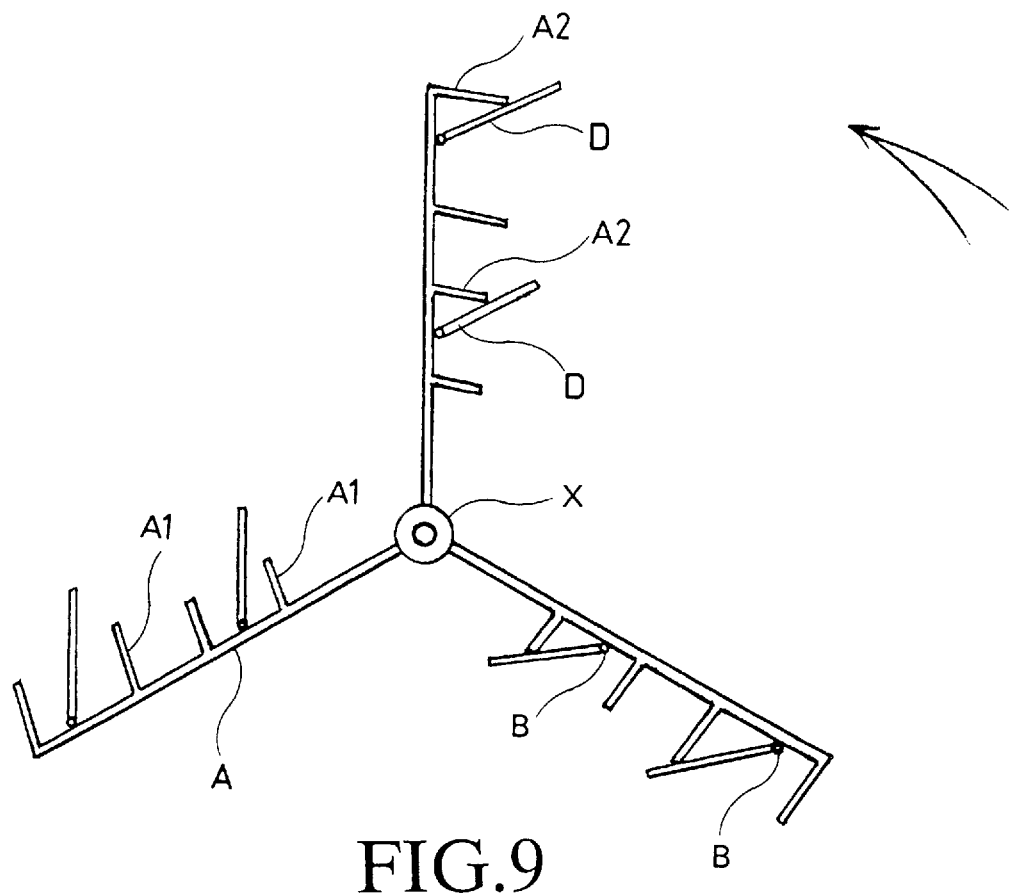
FIG. 9 is a horizontal sectional view of another embodiment of a rotatable wheel of the present invention showing that each limb of a radiate skeleton is connected with two auxiliary axles and their corresponding force accepting assemblies.

2. Each limb of each set of radiate skeleton A on the rotatable wheel stated in the section 1 has two or more auxiliary axles B and their corresponding force accepting assemblies (FIG. 9).

Figure 10:
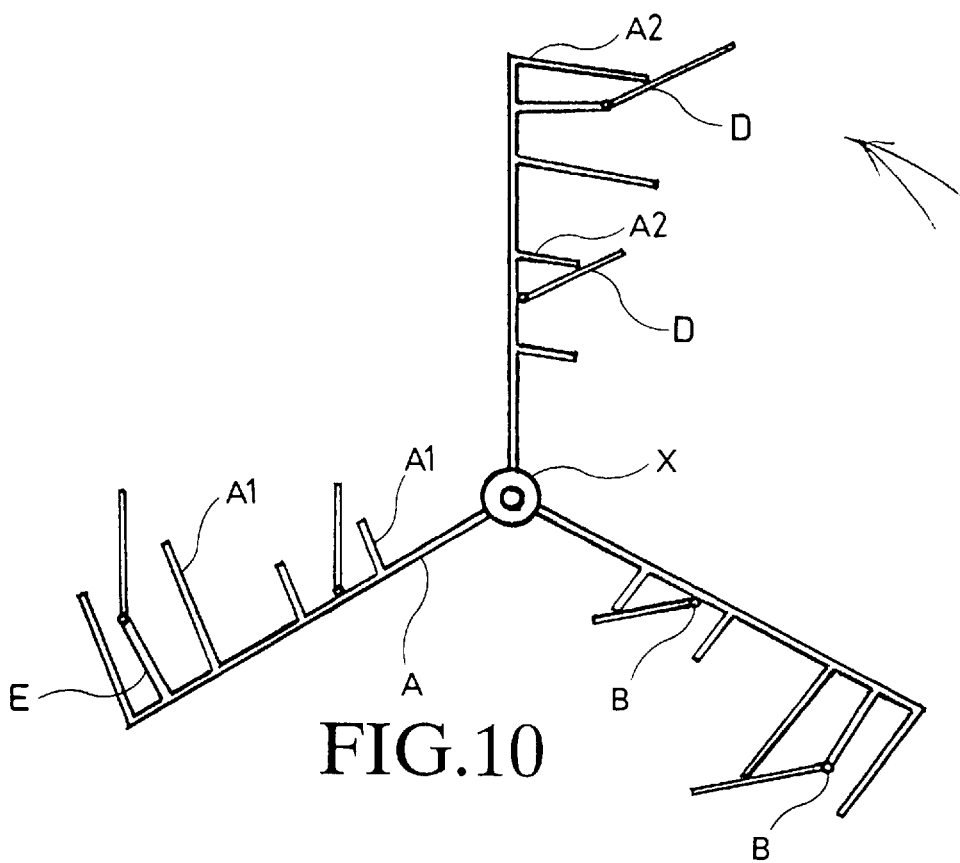
FIG. 10 is a horizontal sectional view of another embodiment of a rotatable wheel of the present invention showing that each limb of a radiate skeleton is connected with two auxiliary axles and their corresponding force accepting assemblies, wherein, each outer auxiliary axle is slightly spaced from the limb of the radiate skeleton.

3. Each limb of each set of radiate skeleton A on the rotatable wheel stated in the above section 1 has two or more auxiliary axles B which each is provided with a movable blade D, each auxiliary axle B which is farther from the rotating axle X connects with a movable blade D via a branch E extending from the limb of the radiate skeleton A and thus is kept a distance from the radiate skeleton A (FIG. 10).

Figure 11:
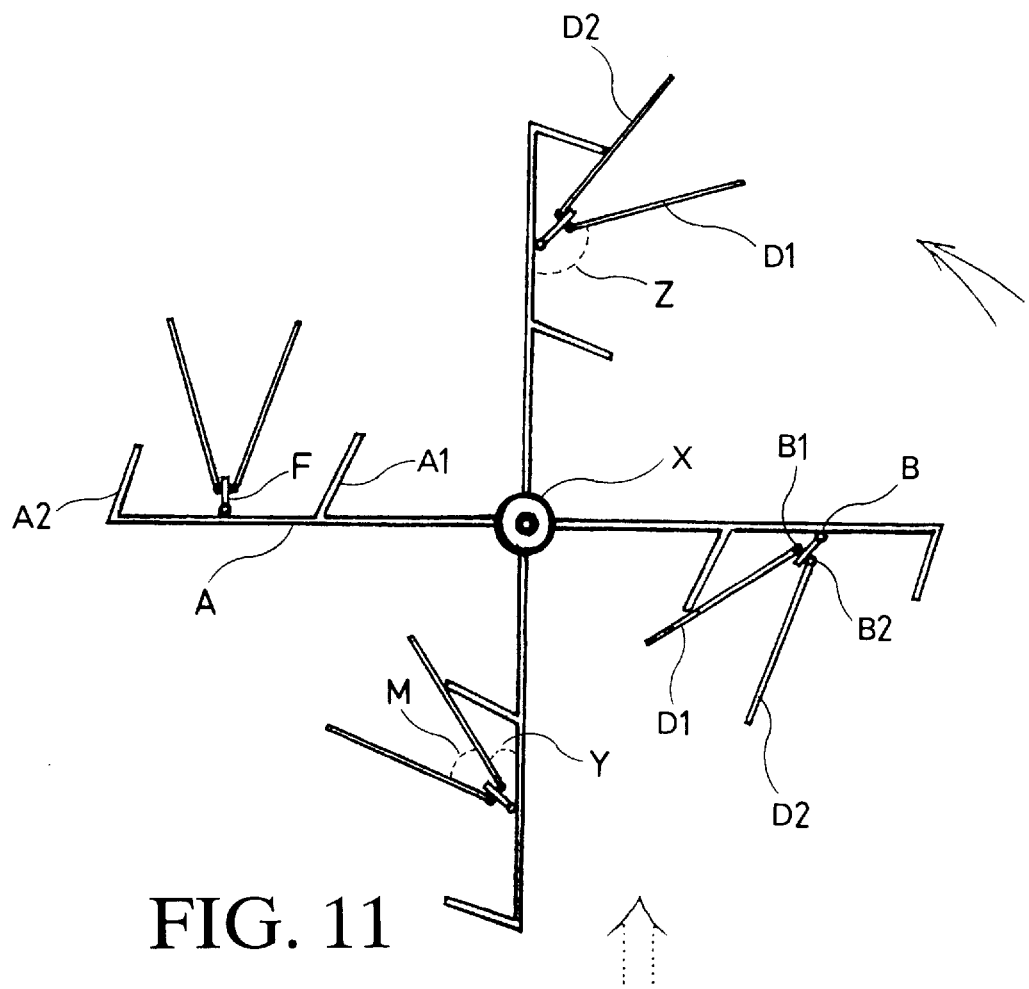
FIG. 11 and 12 are all horizontal sectional views of further embodiments of rotatable wheels of the present invention showing that each limb of a radiate skeleton is connected with a set of force accepting assembly having two pieces of movable blades.
Figure 12:
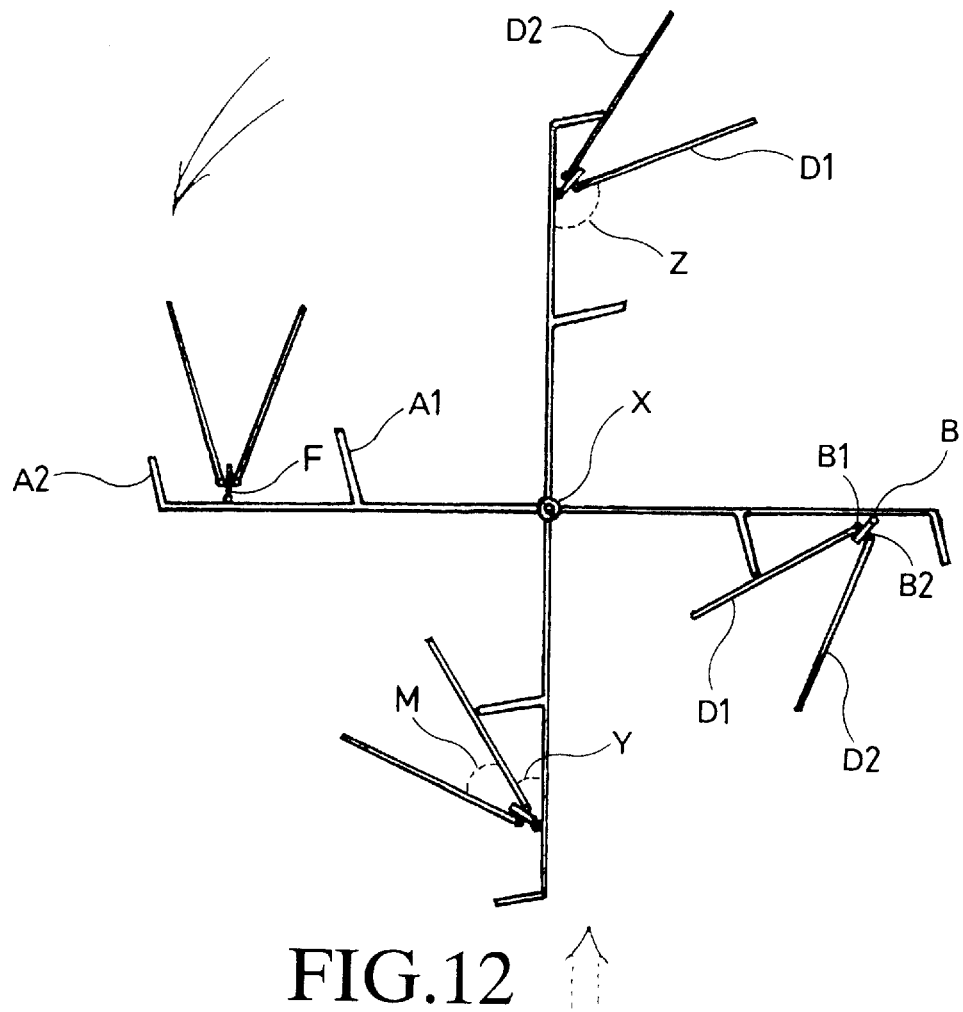

4a). In FIG. 11 and 12 which are all horizontal sectional views of further embodiments of rotatable wheels of the present invention showing that each limb of a radiate skeleton is connected with a set of force accepting assembly having two pieces of movable blades and two corresponding auxiliary axles B1, B2 which each further connects with a movable blade D1, D2. The movable blade D1 can contact the extension portion A1 when it is subjected to a force to be folded inwardly, and when viewing from above, the narrow angle Y between the movable blade D1 and its corresponding radiate skeleton A is about 30 degrees; the movable blade D2 can contact the extension portion A2 when it is subjected to a force to be folded outwardly, and when viewing from above, the wide angle Z between the movable blade D1 and the radiate skeleton A is about 100 to 120 degrees; when the movable blades D1, D2 are close to and contact the force accepting assembly, the angle M therebetween is about 30 to 40 degrees; while if the movable blades D1, D2 are swung apart to contact both the extension portions A1, A2, the angle N therebetween is about 110 to 120 degrees (shown in FIG. 14).

Figure 13:
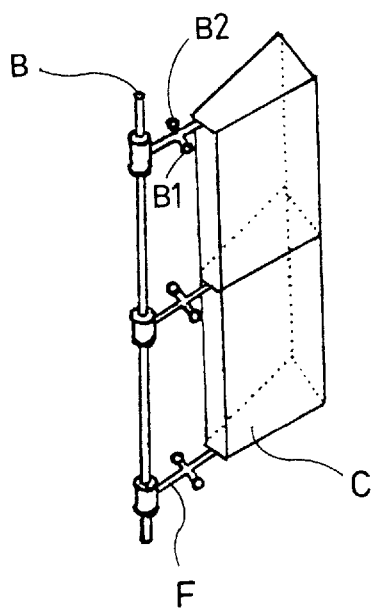
FIG. 13 is a diagramatic drawing showing a pressure resisting body pivotably mounted on an auxiliary axle through a branch extended from a limb, the branch of the limb further is provided on each lateral thereof with an auxiliary axle each for mounting a movable blade.

4 b). In FIG. 13 which is a diagramatic drawing showing a pressure resisting body C is pivotably mounted on an auxiliary axle B on a limb via a plurality of branches F which is extended from the limb and can be swung in the direction opposite to that of external action forces and which each is further provided on each side thereof with an auxiliary axle B1, B2 each for mounting a thin and straight movable blade D1 or D2, this embodiment can also has the angles Y, Z, M, N to be the same as stated in 4 a). The movable blades D1, D2 provide force to operate the rotating axle X, except in the case that they do not yet contact the extension portions A1, A2 when the action force exerted on the movable blades D1 or D2, normally, the movable blades D1, D2 are closed together and are folded inwardly of the rotatable wheel to press the extension portion A1 on the limb, or are closed together and are folded outwardly of the rotatable wheel to press the extension portion A2 on the limb, or both the movable blades D1 or D2 are swung apart to contact both the extension portions A1, A2, they all can activate the rotatable wheel. The movable blades D1, D2 can be made of stiffer material in order not to be bended when they are subjected to the action force. On the extension portions A1, A2, the pressure resisting body C etc. where the movable blades D1 or D2 may contact, elastic members such as sponge members can be added, this can reduce noise.

When the rotatable wheel is placed under water to take tide which continuously surges and retreats, or to take water flow of a river or a canal as a source of pushing force, the total average specific weight of the blades and the whole radiate skeleton had better equal to or be extremely approximate to the specific weight of the water in which the rotatable wheel is mounted; and the surfaces of the blades which face toward the same direction as that of the pushing force can be made streamlined to reduce resistance, and more, the blades can be hollowed, yet they can be divided into a plurality of smaller hollow bodies in order to reduce urgency for being repaired when they are partially broken.

The present invention is characterized by the following points:

1. An auxiliary axle B is mounted on each of the radiate skeletons A provided at the lateral of a limb thereof to the direction opposite to that of external action forces, the auxiliary axle B is parallel to the rotating axle X, a thin and straight movable blade D is provided and connected to each auxiliary axle B, or a set of force accepting assembly having two movable blades D1, D2 can be provided and connected to each auxiliary axle B.

2. Two extension portions A1, A2 of radiate skeleton are provided on the two sides of each auxiliary axle B toward the direction opposite to that of external action forces, the movable blade D or a set of force accepting assembly can contact one extension portion A1 when it is subjected to an action force to be folded inwardly; the movable blade D or the force accepting assembly can contact another extension portion A2 when it is subjected to an action force to be folded outwardly; or only one extension portion A2 of radiate skeleton is provided on each limb of the radiate skeleton A at a location farther from the rotating axle X toward the direction opposite to that of external action forces.

3. When a force accepting assembly is provided with two movable blades D1, D2 each at one side thereof, the force accepting assembly is exactly a pressure resisting body C pivotably mounted on an auxiliary axle B through a branch F of a limb, the branch F of the limb further is provided on each lateral thereof with an auxiliary axle B1 or B2 parallel to the rotating axle X and each for mounting a movable blade D1 or D2.

4. The movable blade D or blades D1, D2 provide force to operate the rotating axle X of the rotatable wheel, no matter they contact and press the extension portions A1, A2 extending from the radiate skeletons A and closer to or away from the rotating axle X when they are subjected to action force to be folded inwardly or outwardly of the rotatable wheel, they can activate the rotatable wheel.

Figure 14:
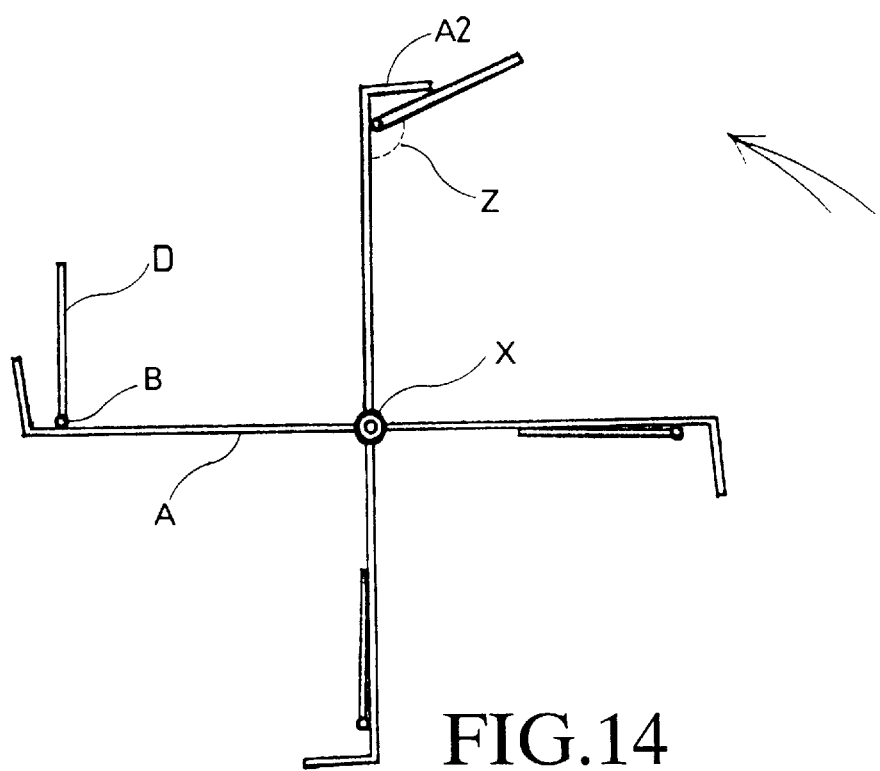
FIG. 14 is a horizontal sectional view of the embodiment of another rotatable wheel of the present invention showing that each limb of a radiate skeleton is connected with two set of force accepting assemblies each having two pieces of movable blades.

5. Each set of the radiate skeletons A on the rotatable wheel can be provided with two or more auxiliary axles B1, B2 and two corresponding force accepting assemblies (as shown in FIG. 14).

Figure 15:
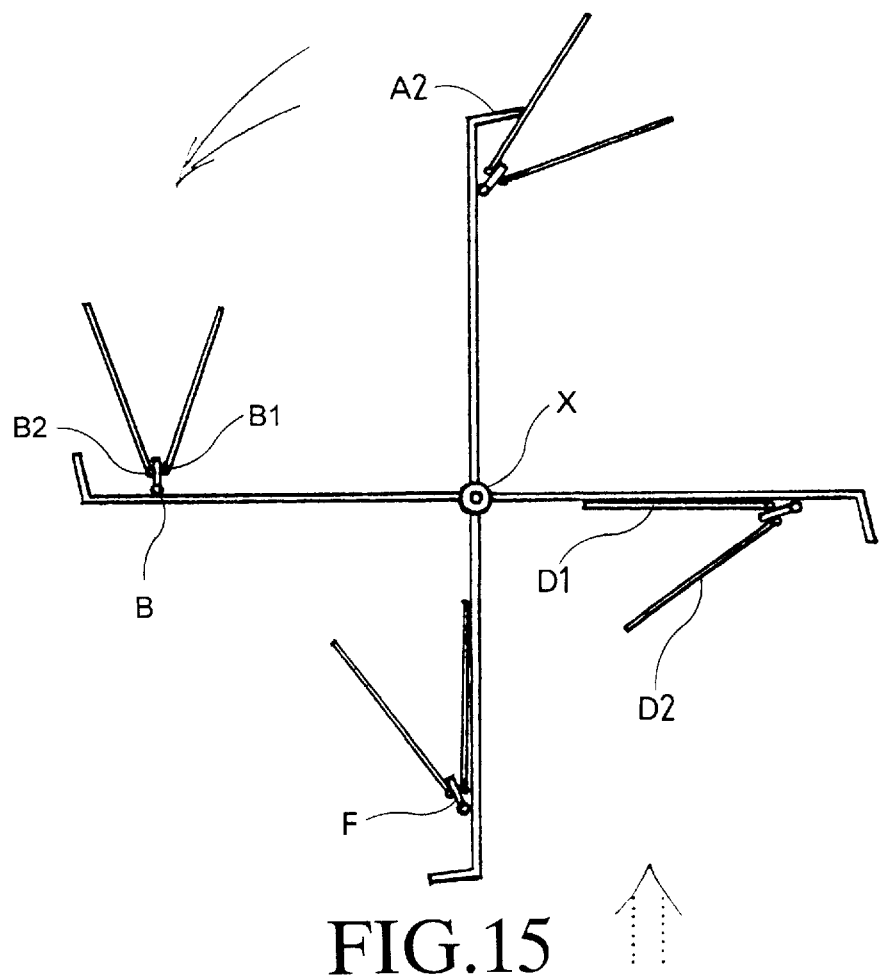
FIG. 15 is a horizontal sectional view of the embodiment of another rotatable wheel of the present invention showing that each limb of a radiate skeleton is connected with two set of force accepting assemblies each having two pieces of movable blades, wherein, each outer auxiliary axle is slightly spaced from the limb of the radiate skeleton.

6. Each auxiliary axle B of each set of the radiate skeletons A provided with two or more auxiliary axles B1, B2 and two corresponding force accepting assemblies, and farther from the rotating axle X of the rotatable wheel, can connect a force accepting assembly via a branch E extended from the limb of the radiate skeleton A and thus is kept a distance from the radiate skeleton A (as shown in FIG. 15).

Figure 16:
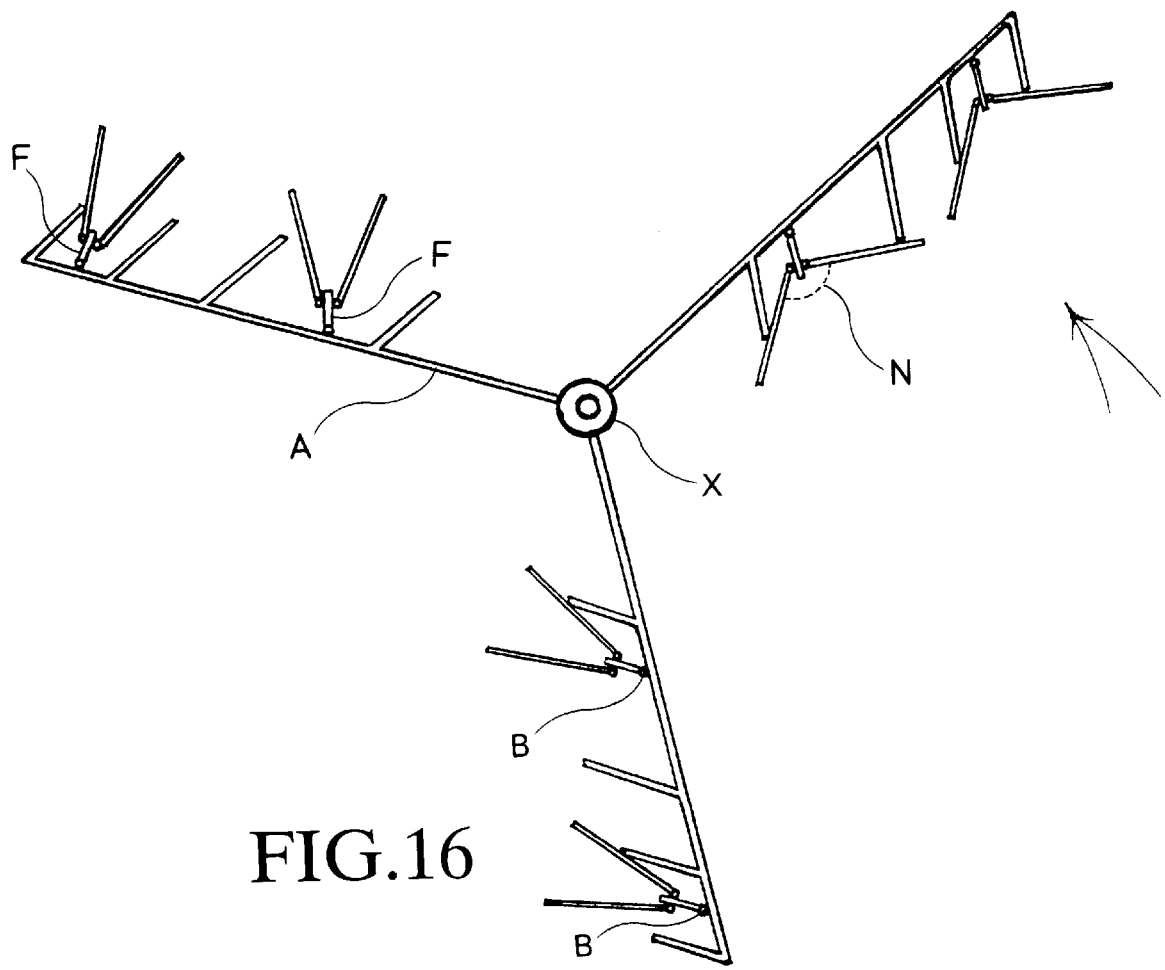
FIG. 16 and 17 are all horizontal sectional views of further embodiments of rotatable wheels of the present invention showing that only one extension portion of radiate skeleton is provided for each force accepting assembly.
Figure 17:
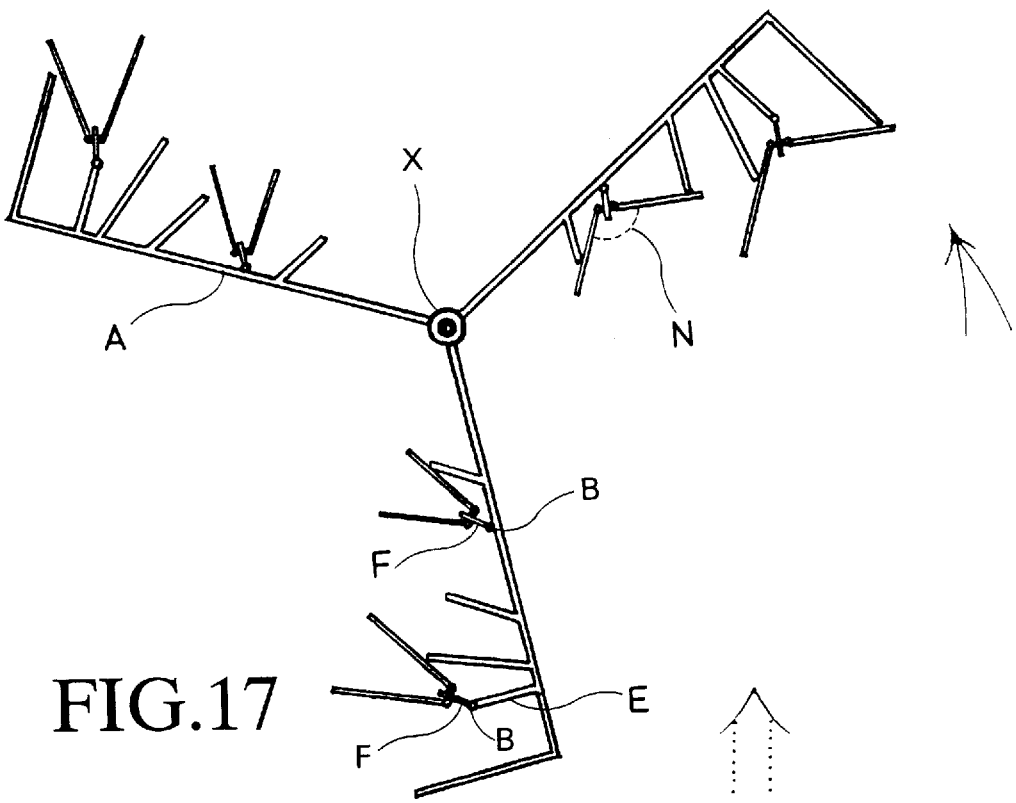

7. Each auxiliary axle B of each set of the radiate 5 skeletons A can be provided on a limb of the radiate skeleton A with only one extension portion A2 of radiate skeleton at a location farther from the rotating axle X toward the direction opposite to that of external action forces, there is no extension portion of radiate skeleton at the area closer to the rotating axle than the auxiliary axle. (as shown in FIG. 16 and 17).

Besides, the thin and straight movable blades D or D1, D2 can be rectangular or square, the surfaces of the blades can be or not be rolled with knurl. The rotating axle X can be placed vertically, horizontally or bevelly, and can be used for one or more rotatable wheels. When a rotating axle X is used for two or more rotatable wheels, firstly, a rotatable wheel is fixed on the rotating axle X, the other rotatable wheels are then one by one turned each for an angle of (360 degrees/ number of the radiate skeletons A on the individual rotatable wheel/number of the rotatable wheels to be mounted on the rotating axle X), and are fixed on the rotating axle X, in this way, the rotating axle X can have better pushing effect when an external force is exerted. When taking wind, air flow etc. as a source of pushing force, the blades and the radiate skeletons had better be as thin, light and slender as possible.

The present invention can have the following advantages:

1. The rotating axle X can be placed vertically, horizontally or bevelly, the pushing forces from any directions except in the direction to which the action force exerted on the movable blades is applied along the auxiliary axle B can be turned into forces for driving the rotating axle X, this can be used in a wide area, e.g., the rotatable wheel or wheels can be mounted in an open space, on a ship deck, on the roof of a building, the top of a hill, sea shore etc. for developing wind power, they can also be used to develop kinetic energy of liquid flow such as tide which continuously surges and retreats, or rapid water flow etc.

2. When being mounted in a narrow or limited space, the blades can be elongated to increase area for bearing force, this can make up for deficiency of shorter arms of force.

3. The present invention is technically simple, and has the advantage of low cost, capability of bearing forces from multiple directions, space saving, wide applicability, non pollution, fuel saving etc., it is therefore easier for promotion.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. A rotatable wheel for developing fluid kinetic energy by accepting external action forces, said rotatable wheel comprises:

a) two to four set of radiate skeletons each having one or more limbs with their inner ends pivotally mounted on a rotating axle;

b) an auxiliary axle being mounted on each of said radiate skeletons provided at the lateral of a limb of said radiate skeleton to the direction opposite to that of external action forces, said auxiliary axle being parallel to said rotating axle, a thin and straight movable blade being provided to connect said auxiliary axle;

c) an extension portion of said radiate skeleton being provided on each side of each said auxiliary axle, said movable blade being able to contact one of said extension portions closer to said rotating axle when being subjected to a force to be folded inwardly; said movable blade further being able to contact the other of said extension portions farther from said rotating axle when being subjected to a force to be folded outwardly, wherein, each limb of each set of said radiate skeletons on said rotatable wheel has at least two auxiliary axles, each said auxiliary axle includes a corresponding force accepting assembly, each said auxiliary axle is provided with one said movable blade, and excepting an auxiliary axle which is closest to said rotating axle, all said auxiliary axles are connected to a movable blade via a branch extending from said limb of said radiate skeleton and thus are kept a distance from said radiate skeleton.

2. The rotatable wheel as stated in claim 1, wherein, each limb of each set of said radiate skeleton on said rotatable wheel is provided with two or more said auxiliary axles, each said auxiliary axle includes a corresponding force accepting assembly.

3. The rotatable wheel as stated in claim 2, wherein each said auxiliary axle of each set of said radiate skeletons is provided on a limb of said radiate skeleton with only one extension portion of said radiate skeleton at a location farther from said rotating axle toward the direction opposite to that of external action forces, there is no extension portion of said radiate skeleton at the area closer to said rotating axle than said auxiliary axle.

4. The rotatable wheel as stated in claim 1, wherein, each said auxiliary axle mounted on said each limb of each set of said radiate skeletons connects with a pressure resisting body via a branch extended from said limb and can be swung in the direction opposite to that of external action forces, a pressure resisting body formed by said radiate skeleton is pivotally mounted on the end of said branch, an auxiliary axle also parallel to said rotating axle is provided at each lateral of said swinging branch said two auxiliary axles at both laterals of said branch each connects with a thin and straight movable blade, when said movable blades are closed, the angle between said movable blades is about 30 to 40 degrees; while if said movable blades are swung apart to contact both said extension portions, the angle therebetween is about 110 to 120 degrees; when said movable blades are subjected to a force to be folded inwardly, one of said movable blades being closer to said rotating axle can contact an inner one of said extension portions, the narrow angle between said movable blade and its corresponding radiate skeleton is about 30 degrees; when said movable blades are subjected to a force to be folded outwardly, the other of said movable blades being farther from said rotating axle can contact the outer one of said extension portions, the wide angle between said movable blade and said radiate skeleton is about 100 to 120 degrees.

5. The rotatable wheel as stated in claim 4, wherein each said auxiliary axle of each set of said radiate skeletons is provided on a limb of said radiate skeleton with only one extension portion of said radiate skeleton at a location farther from said rotating axle toward the direction opposite to that of external action forces, there is no extension portion of said radiate skeleton at the area closer to said rotating axle than said auxiliary axle.

6. The rotatable wheel as stated in claim 1, wherein, each limb of each set of said radiate skeleton on said rotatable wheel is provided with two or more said auxiliary axles, each said auxiliary axle includes a corresponding force accepting assembly.

7. The rotatable wheel as stated in claim 6, wherein each said auxiliary axle of each set of said radiate skeletons is provided on a limb of said radiate skeleton with only one extension portion of said radiate skeleton at a location farther from said rotating axle toward the direction opposite to that of external action forces, there is no extension portion of said radiate skeleton at the area closer to said rotating axle than said auxiliary axle.

8. The rotatable wheel as stated in claim 1, wherein each said auxiliary axle of each set of said radiate skeletons is provided on a limb of said radiate skeleton with only one extension portion of said radiate skeleton at a location farther from said rotating axle toward the direction opposite to that of external action forces, there is no extension portion of said radiate skeleton at the area closer to said rotating axle than said auxiliary axle.

9. The rotatable wheel as stated in claim 1, wherein each said auxiliary axle of each set of said radiate skeletons is provided on a limb of said radiate skeleton with only one extension portion of said radiate skeleton at a location farther from said rotating axle toward the direction opposite to that of external action forces, there is no extension portion of said radiate skeleton at the area closer to said rotating axle than said auxiliary axle.

10. A rotatable wheel for developing fluid kinetic energy by accepting external action forces, said rotatable wheel comprises:

a) two to four set of radiate skeletons each having one or more limbs with their inner ends pivotably mounted on a rotating axle;

b) an auxiliary axle being mounted on each of said radiate skeletons provided at the lateral of a limb of said radiate skeleton to the direction opposite to that of external action forces, said auxiliary axle being parallel to said rotating axle, a thin and straight movable blade being provided to connect said auxiliary axle;

c) an extension portion of said radiate skeleton being provided on each side of each said auxiliary axle, said movable blade being able to contact one of said extension portions closer to said rotating axle when being subjected to a force to be folded inwardly; said movable blade further being able to contact the other of said extension portions farther from said rotating axle when being subjected to a force to be folded outwardly, each said auxiliary axle mounted on said each limb of each set of said radiate skeletons connects with a pressure resisting body via a branch extended from said limb and can be swung in the direction opposite to that of external action forces, a pressure resisting body formed by said radiate skeleton is pivotably mounted on the end of said branch, an auxiliary axle also parallel to said rotating axle is provided at each lateral of said swinging branch said two auxiliary axles at both laterals of said branch each connects with a thin and straight movable blade, when said movable blades are closed, the angle between said movable blades is about 30 to 40 degrees; while if said movable blades are swung apart to contact both said extension portions, the angle therebetween is about 110 to 120 degrees; when said movable blades are subjected to a force to be folded inwardly, one of said movable blades being closer to said rotating axle can contact an inner one of said extension portions, the narrow angle between said movable blade and its corresponding radiate skeleton is about 30 degrees; when said movable blades are subjected to a force to be folded outwardly, the other of said movable blades being farther from said rotating axle can contact the outer one of said extension portions, the wide angle between said movable blade and said radiate skeleton is about 100 to 120 degrees, and each limb of each set of said radiate skeletons on said rotatable wheel has two or more auxiliary axles and their corresponding force accepting assemblies, said auxiliary axles each is provided with one said movable blade, and except that which is closest to said rotating axle, all said auxiliary axles which are farther from said rotating axle each connects a movable blade via a branch extending from said limb radiate skeleton and thus is kept a distance from said radiate skeleton, the more are said auxiliary axles on each said radiate skeleton, the farther the one of said auxiliary axles far from said rotating axle is from said radiate skeleton.

11. The rotatable as stated in claim 10, wherein each said auxiliary axle of each set of said radiate skeletons is provided on a limb of said radiate skeleton with only one extension portion of said radiate skeleton at a location farther from said rotating axle toward the direction opposite to that of external action forces, there is no extension portion of said radiate skeleton at the area closer to said rotating axle than said auxiliary axle.

* * * * *